United States Patent
Branco

(10) Patent No.: US 10,423,778 B2
(45) Date of Patent: Sep. 24, 2019

(54) TURING COMPLETENESS DISABLING

(71) Applicant: Intel Corporation, Santa Clara, CA (US)

(72) Inventor: Rodrigo R. Branco, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 291 days.

(21) Appl. No.: 15/394,608

(22) Filed: Dec. 29, 2016

(65) Prior Publication Data

US 2018/0189480 A1 Jul. 5, 2018

(51) Int. Cl.
*G06F 21/52* (2013.01)
*G06F 21/57* (2013.01)

(52) U.S. Cl.
CPC ............ *G06F 21/52* (2013.01); *G06F 21/577* (2013.01); *G06F 2212/1052* (2013.01)

(58) Field of Classification Search
CPC ....................................................... G06F 21/52
See application file for complete search history.

(56) References Cited

U.S. PATENT DOCUMENTS

| 2001/0013094 A1* | 8/2001 | Etoh | G06F 9/4486 712/227 |
| 2014/0123281 A1* | 5/2014 | Fischer | G06F 21/566 726/23 |
| 2016/0196428 A1* | 7/2016 | Momot | G06F 21/54 726/23 |
| 2016/0283410 A1* | 9/2016 | Rubira Branco | G06F 21/52 |

OTHER PUBLICATIONS

Torrey, Jacob I., et al., "Verification State-Space Reduction Through Restricted Parsing Environments", 2015 IEEE CS Security and Privacy Workshops; 106-116, (2015), 11 pgs.

* cited by examiner

*Primary Examiner* — Simon P Kanaan
(74) *Attorney, Agent, or Firm* — Schwegman Lundberg & Woessner, P.A.

(57) ABSTRACT

Described herein are techniques for dealing with the problem of security vulnerabilities in computer software due to undefined behavior that may be exploited by attackers. A way of dealing with this problem is to remove an essential capability for most advanced attacks, Turing completeness. That is, a piece of software is provided the ability to specify that it does not need Turing completeness (i.e., backward computation) in order to perform a given task such as parsing. During this stage, attackers are prevented from abusing the system by performing, for example, return oriented programming.

25 Claims, 3 Drawing Sheets

TURING COMPLETENESS DISABLING

BACKGROUND

Undefined behavior of computer software may be exploited by attackers to execute arbitrary code, gain privileges, and commit other acts. An example of this is return-oriented programming (ROP), where an attacker uses a bug in the software to cause buffer overflows of data. The attacker then constructs a number of "gadgets" from existing code whose addresses are chained together on the stack. When a return instruction is repeatedly called, the gadgets are executed. This type of operation where existing code is chained together and driven with buffer overflow is sometimes called a "weird machine." A simple software bug may thus become a serious security vulnerability. The present disclosure relates to techniques for dealing with this problem.

DETAILED DESCRIPTION

Figure 1:
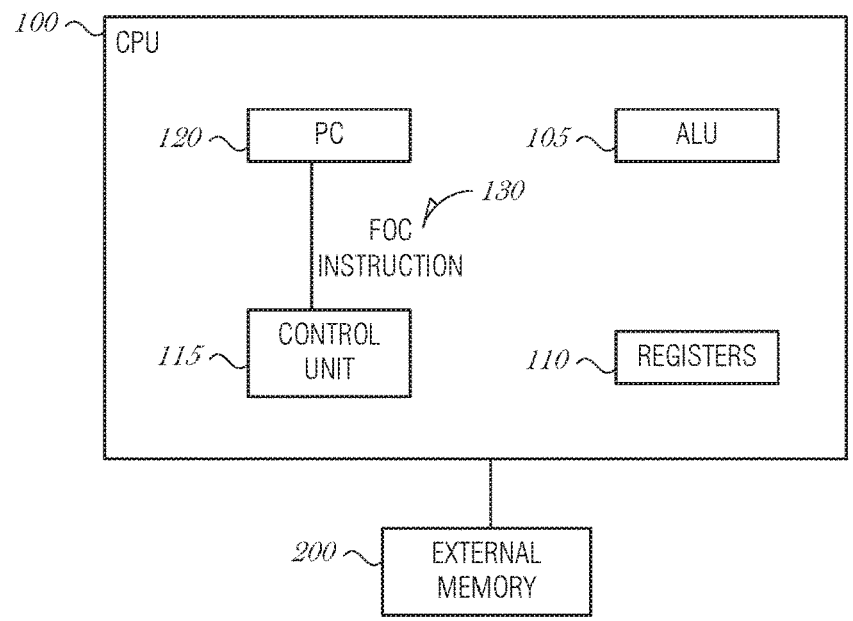
FIG. 1 illustrates a central processing unit that incorporates a forward-only computing mode according to an embodiment.

A program parser is a recognizer of a particular language of valid inputs in software. Ideally, it would be compiled to suit the limited computational model that is no stronger than the recognition task at hand. If such a parser fails, undefined behavior occurs, and that undefined behavior may be exploited by attackers to gain control of the system and commit malicious acts (e.g., by constructing "weird machines"). The present disclosure relates to a way of dealing with this problem by removing an essential capability for most advanced attacks, Turing completeness. That is, a piece of software is provided the ability to specify that it does not need Turing completeness (i.e., backward computation) in order to perform a given task such as parsing. During this stage, any parsing bugs would then not give complete control to attackers for them to abuse the system by performing, for example, ROP. To accomplish this, a state of execution for the central processing unit CPU may be defined that is referred to herein as "forward-only computing."

The main challenges in preventing the exploitation of security vulnerabilities in computer software are due to the high complexity of the problem scope. Given the unknown visibility of the memory layout of each software and code, it is difficult to prevent abuse cases. Having the ability to remove computational power from a piece of code is a desired, but that involves a complex mechanism. That removal gives many practical benefits for the code that do not need so much computational power (in the sense of language complexity). These include the possibility to fully formal verify the code without reducing the computational models (a known challenge in formal proofs) and the ability to analyze the entire range of security issues.

To provide a Turing incomplete computing environment, a processor or processor core may incorporate a mechanism for preventing backward computation such as backward jumps and function calls, referred to herein as a forward-only computing (FOC) mode. In an embodiment, when the FOC mode is activated, the processor or processor core disallows program counter (PC) decrements until the FOC is deactivated. Complex code parts, such as parsers, can activate the FOC mode when inputs do not require Turing complete computing power. Those pieces of code utilizing the FOC mode can be formally proven and/or statically analyzed for issues. Even if a security vulnerability were to exist in the code, the impact would be minimal as code reuse and injection would be highly limited. The FOC mode requires only minimal software changes to support and operating system changes to enable. The FOC mode may be implemented in a number of different ways. In an embodiment, a particular model specific register (MSR) is used to activate/deactivate the FOC mode. For example, setting the MSR would disallow decrements of the PC until the MSR is cleared. Other embodiments may use a particular instruction to activate the FOC mode.

Figure 2:
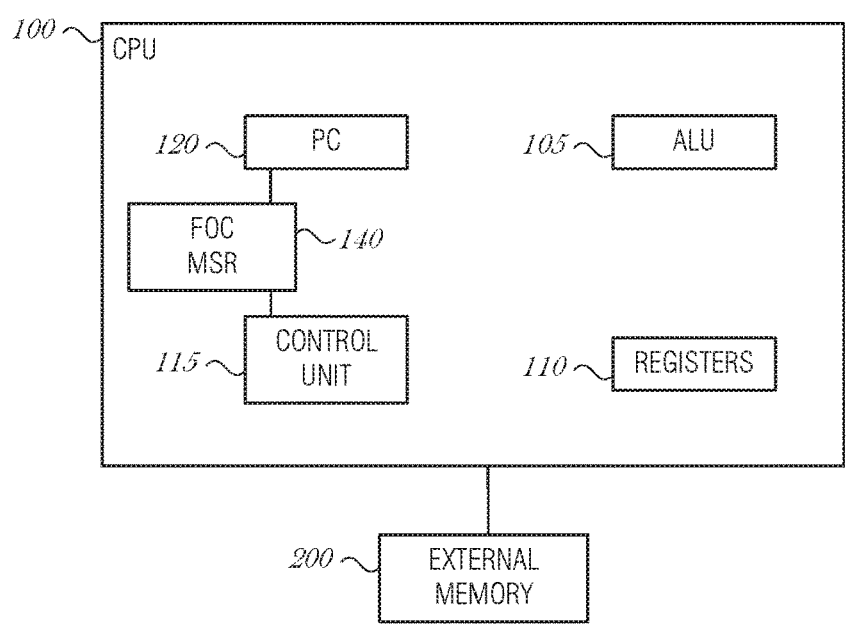
FIG. 2 illustrates a central processing unit that incorporates a forward-only computing mode according to an embodiment.

FIGS. 1 and 2 illustrate examples of a central processing unit (CPU) 100 whose basic components according to some embodiments include an arithmetic logic unit (ALU) 105 that performs arithmetic and logic operations, processor registers 110 that supply operands to the ALU and store the results of ALU operations, and a control unit 115. The control unit 115 transfers data and instructions to and from an external memory 200 and coordinates the operations of the ALU 105, registers 110 and other components. The program counter (PC) 120, also sometimes called the instruction pointer or the instruction address register, is a processor register that contains the memory address (i.e., points to) of either the next instruction to be executed or to the current instruction being executed, depending upon the particular processor architecture. The PC 120 is usually incremented after each execution so that instructions are fetched sequentially from memory 200 and executed. Instructions in executing code may change the sequence by placing new values in the PC 120 in order to enable branching, looping, subroutine calls, and returns.

In order to incorporate a forward-only computing (FOC) mode, the CPU 100 provides a mechanism that prevents the contents of the PC 120 from being decremented. That is, when the forward-only computing mode is activated, an address that is less than the current address contained in the PC 120 is prevented from being loaded therein. FIG. 1 shows an embodiment for implementing the forward-only computing mode in which the instruction set includes a forward-only computing instruction 130 that when executed activates the forward-only computing mode. In an embodiment, the instruction acts as a toggle so that successive executions turn on and turn off the forward-only computing mode. FIG. 2 shows another embodiment in which an FOC model specific register (MSR) 140 is provided so that writing to the register turns on or turns off the forward-only computing mode.

Figure 3:
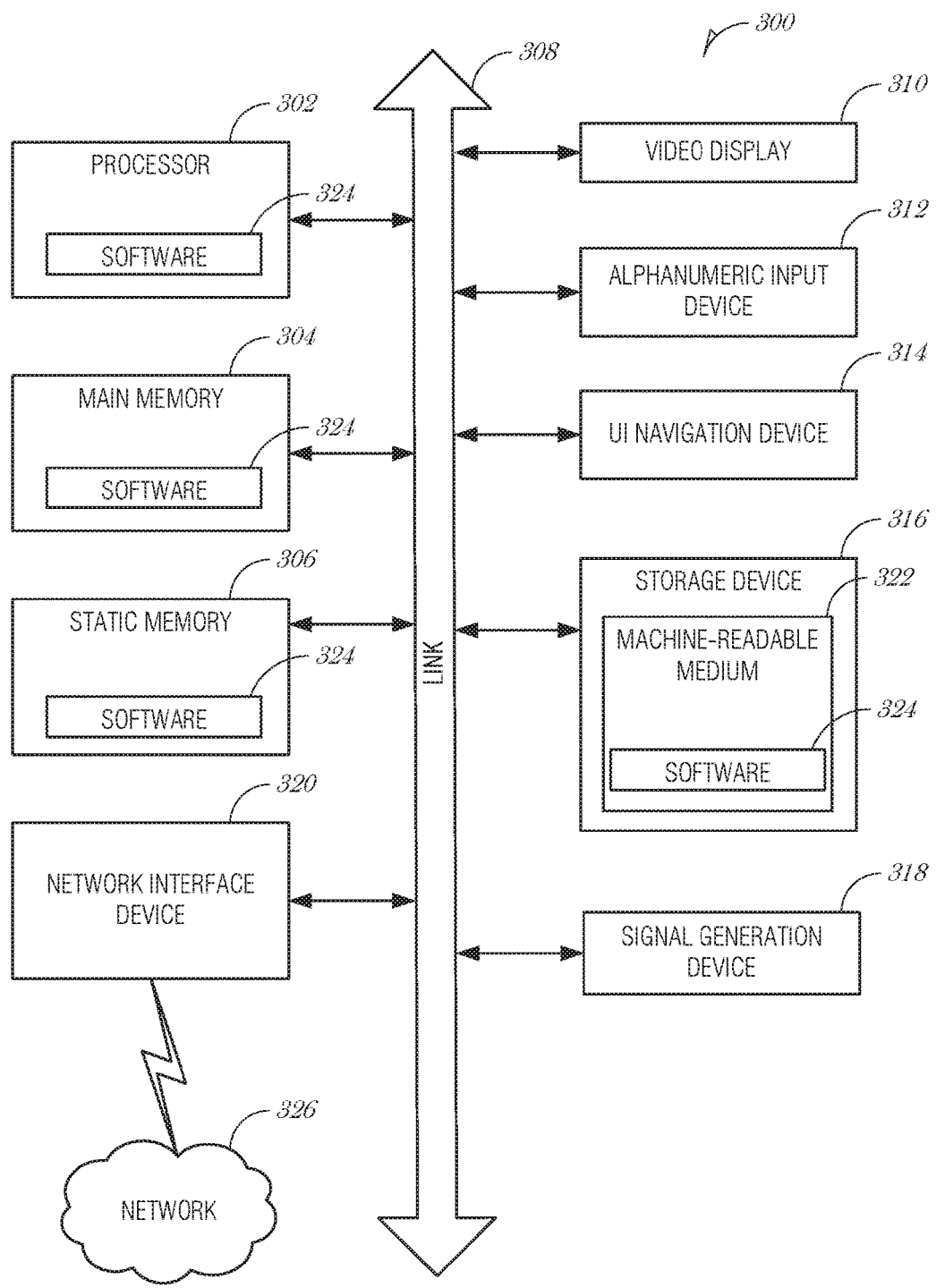
FIG. 3 is a block diagram illustrating an example machine upon which any one or more of the techniques (e.g., methodologies) discussed herein may perform, according to an example embodiment.

In an embodiment, a computer system such as illustrated by FIG. 3 is used to execute a software program loaded into memory that has one or more statements in the program that activate or deactivate a forward-only computing mode in which decrementing of a program counter of the processor is prevented. The software program may be, for example, an input character parser, part of the operating system (OS)

software including the OS kernel, part of just-in-time code in the operating system kernel, part of an Abstract Syntax Notation One (ASN .1) parser, or part of a fonts parser. In an embodiment the software program is implemented in ucode.

In some embodiments, a multi-tasking operating system (OS) running in a computer system such as illustrated in FIG. 3 is configured to provide a system call by which an execution stream such as a thread or process (e.g., either a user process or an OS process) may activate or de-activate the FOC mode, referred to herein as an FOC activation call or FOC de-activation call, respectively. When an FOC activation call is made, the OS activates the FOC mode and continues executing the process or thread in the FOC mode until an FOC de-activation call is made by the process or thread or until a context switch occurs. If a context switch occurs (e.g., due to an interrupt or due to action by the OS scheduler) prior to the process or thread terminating, the OS saves the context of the process or thread for later restoration when the process or thread is scheduled again. In an embodiment, if the context switch occurs while the FOC mode is active, the OS saves the context conventionally (e.g., by saving register states and memory configuration) and de-activates the FOC mode. When the process or thread is again executed, the OS restores the context and additionally activates the FOC mode. Alternatively, if the context switch occurs while the FOC mode is active, the OS saves the context of the process or thread which is made to include the FOC mode state so that, when the context is restored, the FOC mode is automatically re-activated.

In some embodiments, the OS may be configured to de-activate the FOC mode when a context switch occurs while a process or thread is executing in FOC mode only if the context switch involves switching to a process in a higher privilege level. For example, if a process executing in an application privilege layer (e.g., ring 3 according to some OS conventions) activates the FOC mode, the FOC mode is de-activated when a context switch occurs that involves switching to a higher privilege layer such as a kernel process (e.g., ring 0) or device driver process (e.g., ring 1 or 2). In another example, if a context switch occurs while a kernel process is executing in FOC mode, where the context switch involves switching to a lower privilege layer process, no de-activation of the FOC mode occurs.

Figure 4:
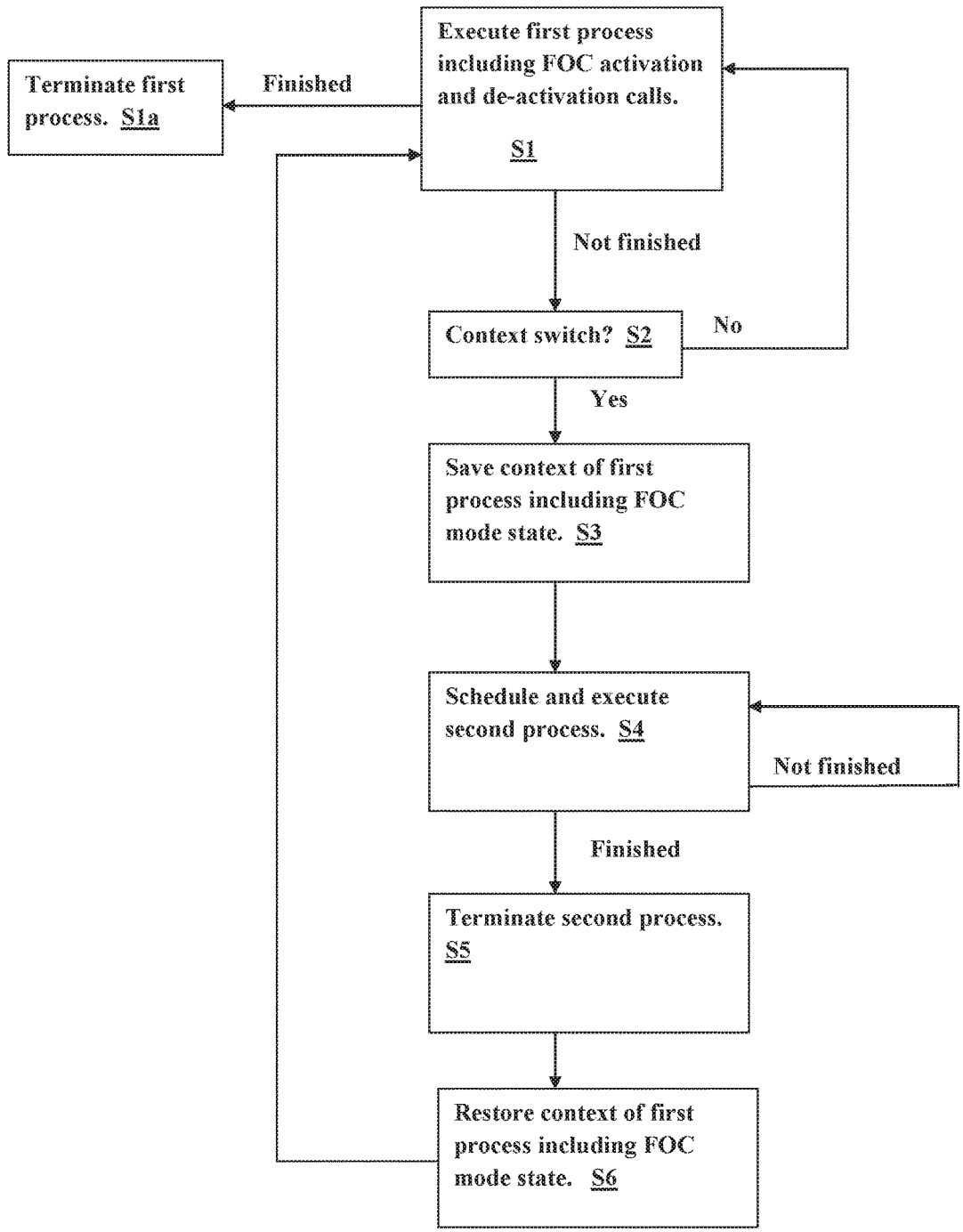
FIG. 4 illustrates an example procedure by which an operating system implements a forward-only computing mode according to some embodiments.

FIG. 4 illustrates a method performed by the OS in implementing an FOC mode according to an embodiment. At stage S1, the OS schedules a first process for execution, where the first process may activate and deactivate the FOS mode via system calls during execution. If the first process finishes, the OS terminates the process at stage S1a. Otherwise, the OS monitors for context switching events at stage 2. If a context switch occurs, the context of the first process is saved including the FOC mode state at stage S3. A second process is then scheduled and executed at stage S4 until termination at stage S5. After the second process is finished, the context of the first process including the FOC mode state is restored at stage S6, and a return is made to stage S1 to continue execution of the first process.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hard-wired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

FIG. 3 is a block diagram illustrating a machine in the example form of a computer system 300, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 300 includes at least one processor 302 (e.g., a central processing unit (CPU), a graphics processing unit (GPU) or both, processor cores, compute nodes, etc.), a main memory 304 and a static memory 306, which communicate with each other via a link 308 (e.g., bus). The computer system 300 may further include a video display unit 310, an alphanumeric input device 312. (e.g., a keyboard), and a user interface (UI) navigation device 314 (e.g., a mouse). In an embodiment, the video display unit 310, input device 312 and UI navigation device 314 are incorporated into a touch screen display. The computer system 300 may additionally include a storage device 316 (e.g., a drive unit), a signal generation device 318 (e.g., a speaker), a network interface device 320, and one or more sensors (not shown), such as a global positioning system (GPS) sensor, compass, accelerometer, gyrometer, magnetometer, or other sensor.

The storage device 316 includes a machine-readable medium 322 on which is stored one or more sets of data structures and instructions 324 (e.g., software) embodying or utilized by any one or more of the methodologies or functions described herein. The instructions 324 may also reside, completely or at least partially, within the main memory 304, static memory 306, and/or within the processor 302 during execution thereof by the computer system 300, with the main memory 304, static memory 306, and the processor 302 also constituting machine-readable media.

While the machine-readable medium 322 is illustrated in an example embodiment to be a single medium, the term "machine-readable medium" may include a single medium or multiple media (e.g., a centralized or distributed database, and/or associated caches and servers) that store the one or more instructions 324. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 324 may further be transmitted or received over a communications network 326 using a transmission medium via the network interface device 320 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a processor to implement Turing completeness disabling, comprising: an arithmetic logic unit (ALU), a plurality of processor registers; a control unit for communicating with a memory for coordinating the operations of the ALU and processor registers to execute instructions fetched from the memory; a program counter for containing an address of a next instruction to be executed or an address of a currently executing instruction; and circuitry for preventing the program counter from being loaded with an address less than an address currently contained in the program counter when a forward-only computing mode is activated.

In Example 2, the subject matter of Example 1 optionally includes a model specific register that when set or cleared, respectively activates or deactivates the forward-only computing mode.

In Example 3, the subject matter of any one or more of Examples 1-2 optionally include wherein an instruction set of the processor includes an instruction for activating and deactivating the forward-only computing mode.

In Example 4, the subject matter of any one or more of Examples 1-3 optionally include wherein the processor has multiple cores and wherein the circuitry for preventing the program counter from being loaded with an address less than the address currently contained in the program counter when the forward-only computing mode is activated operates on a per-core basis.

In Example 5, the subject matter of any one or more of Examples 1-4 optionally include a memory for containing instructions and data, wherein the memory is incorporated into the processor.

Example 6 is a computer system to implement Turing completeness disabling, comprising: a processor and memory; a program contained in the memory and executed by the processor; and one or more statements in the program that activate or deactivate a forward-only computing mode in which decrementing of a program counter of the processor is prevented.

In Example 7, the subject matter of Example 6 optionally includes wherein the program is an input character parser.

In Example 8, the subject matter of any one or more of Examples 6-7 optionally include wherein the program is part of operating system (OS) software.

In Example 9, the subject matter of Example 8 optionally includes wherein the program is part of an operating system kernel.

In Example 10, the subject matter of any one or more of Examples 8-9 optionally include wherein the program is part of just-in-time code in the operating system kernel.

In Example 11, the subject matter of any one or more of Examples 8-10 optionally include) parser.

In Example 12, the subject matter of any one or more of Examples 8-11 optionally include wherein the program is part of a fonts parser.

In Example 13, the subject matter of any one or more of Examples 6-12 optionally include wherein the program is implemented in ucode.

Example 14 is at least one computer-readable medium comprising instructions to cause a computer system, upon execution of the instructions by a processor of the computing system, to activate or deactivate a forward-only computing mode in which decrementing of a program counter of the processor is prevented.

In Example 15, the subject matter of Example 14 optionally includes instructions for an input character parser.

In Example 16, the subject matter of any one or more of Examples 14-15 optionally include instructions for part of an operating system kernel.

In Example 17, the subject matter of any one or more of Examples 14-16 optionally include instructions for part of just-in-time code in the operating system kernel.

In Example 18, the subject matter of any one or more of Examples 14-17 optionally include) parser.

In Example 19, the subject matter of any one or more of Examples 14-18 optionally include instructions for part of a fonts parser.

In Example 20, the subject matter of any one or more of Examples 14-19 optionally include wherein the instructions are implemented in ucode.

Example 21 is a method for operating a processor to implement Turing completeness disabling, comprising: executing instructions fetched from a memory; storing an address of a next instruction to be executed or an address of a currently executing instruction in a program counter; and activating a forward-only computing mode to prevent the program counter from being loaded with an address less than an address currently contained in the program counter.

In Example 22, the subject matter of Example 21 optionally includes setting a model specific register to activate the forward-only computing mode.

In Example 23, the subject matter of any one or more of Examples 21-22 optionally include activating the forward-only computing mode with an executed instruction.

In Example 24, the subject matter of any one or more of Examples 21-23 optionally include wherein the processor has multiple cores and further comprising activating the forward-only computing mode on a per-core basis.

In Example 25, the subject matter of any one or more of Examples 21-24 optionally include executing instructions stored in a memory incorporated into the processor.

Example 26 is a method for operating a computer system to implement Turing completeness disabling, comprising: storing a program in a memory and executing the program, activating a forward-only computing mode in which decrementing of a program counter of the processor is prevented by one or more statements in the program.

In Example 27, the subject matter of Example 26 optionally includes wherein the program is an input character parser.

In Example 28, the subject matter of any one or more of Examples 26-27 optionally include wherein the program is part of operating system (OS) software.

In Example 29, the subject matter of Example 28 optionally includes wherein the program is part of an operating system kernel.

In Example 30, the subject matter of any one or more of Examples 28-29 optionally include wherein the program is part of just-in-time code in the operating system kernel.

In Example 31, the subject matter of any one or more of Examples 28-30 optionally include) parser.

In Example 32, the subject matter of any one or more of Examples 28-31 optionally include wherein the program is part of a fonts parser.

In Example 33, the subject matter of any one or more of Examples 26-32 optionally include wherein the program is implemented in ucode.

In Example 33a, the subject matter of any one or more of Examples 26-32 optionally include running an operating system and wherein the forward-only computing mode is activated and de-activated via an operating system call.

In Example 33b, the subject matter of Example 33a optionally includes wherein the operating system, when a context switch occurs, de-activates the forward-only computing mode if present and saves the context of a currently running process or thread.

In Example 33c, the subject matter of Example 33a or 33b optionally includes wherein the operating system, when a context switch occurs, saves the context of a currently running process or thread and de-activates the forward-only computing mode if present only if the context switch involves switching to a process or thread with a higher privilege level.

In Example 33d, the subject matter of any one or more of Examples 33a-33c optionally includes wherein the operating system, when a context switch occurs, saves the context of a currently running process or thread that includes the forward-only computing mode state.

In Example 33e, the subject matter of any one or more of Examples 33a-33d optionally includes wherein the operating system, after a context switch is completed, returns to a process or thread executing in a forward-only computing mode by restoring the context of the process or thread and re-activating the forward-only computing mode either explicitly or from the saved context.

Example 34 is at least one computer-readable medium comprising instructions to perform the methods recited by any of Examples 21 through 33.

Example 35 is a processor to implement Turing completeness disabling, comprising means for performing the methods recited by any of Examples 21 through 25.

Example 36 is a computer system to implement Turing completeness disabling, comprising means for performing the methods recited by any of Examples 26 through 33.

Example 37 is a processor to implement Turing completeness disabling, comprising: means for executing instructions fetched from a memory; means for storing an address of a next instruction to be executed or an address of a currently executing instruction in a program counter; and means for activating a forward-only computing mode to prevent the program counter from being loaded with an address less than an address currently contained in the program counter.

In Example 38, the subject matter of Example 37 optionally includes means for setting a model specific register to activate the forward-only computing mode.

In Example 39, the subject matter of any one or more of Examples 37-38 optionally include means for activating the forward-only computing mode with an executed instruction.

In Example 40, the subject matter of any one or more of Examples 37-39 optionally include wherein the processor has multiple cores and further comprising means for activating the forward-only computing mode on a per-core basis.

in Example 41, the subject matter of any one or more of Examples 37-40 optionally include means for executing instructions stored in a memory incorporated into the processor.

Example 42 is a computer system to implement Turing completeness disabling, comprising: means for storing a program in a memory and executing the program, means for activating a forward-only computing mode in which decrementing of a program counter of the processor is prevented by one or more statements in the program.

In Example 43, the subject matter of Example 42 optionally includes wherein the program is an input character parser.

In Example 44, the subject matter of any one or more of Examples 42-43 optionally include wherein the program is part of operating system (OS) software.

In Example 45, the subject matter of any one or more of Examples 42-44 optionally include wherein the program is part of an operating system kernel.

In Example 46, the subject matter of any one or more of Examples 42-45 optionally include wherein the program is part of just-in-time code in the operating system kernel.

In Example 47, the subject matter of any one or more of Examples 42-46 optionally include wherein the program is a parser.

In Example 48, the subject matter of any one or more of Examples 42-47 optionally include wherein the program is part of a fonts parser.

In Example 49, the subject matter of any one or more of Examples 42-48 optionally include wherein the program is implemented in ucode.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A processor to implement Turing completeness disabling, comprising:
   an arithmetic logic unit (ALU);
   a plurality of processor registers;
   a control unit to communicate with a memory and to coordinate the operations of the ALU and processor registers in executing instructions fetched from the memory;
   a program counter to contain an address of a next instruction to be executed or an address of a currently executing instruction; and,
   circuitry to activate and de-activate a forward-only computing mode, wherein the program counter is prevented from being loaded with an address less than an address currently contained in the program counter when the forward-only computing mode is activated.

2. The processor of claim 1 further comprising a model specific register that when set or cleared, respectively activates or deactivates the forward-only computing mode.

3. The processor of claim 1 wherein an instruction set of the processor includes an instruction for activating and deactivating the forward-only computing mode.

4. The processor of claim 1 wherein the processor has multiple cores and wherein the circuitry for preventing the program counter from being loaded with an address less than the address currently contained in the program counter when the forward-only computing mode is activated operates on a per-core basis.

5. The processor of claim 1 further comprising a memory for containing instructions and data, wherein the memory is incorporated into the processor.

6. A computer system to implement Turing completeness disabling, comprising:
   a processor and memory;
   a program contained in the memory and executed by the processor; and,
   one or more statements in the program that activate or deactivate a forward-only computing mode in which decrementing of a program counter of the processor is prevented.

7. The computer system of claim 6 wherein the program is an input character parser.

8. The computer system of claim 6 wherein the program is part of operating system (OS) software.

9. The computer system of claim 8 wherein the program is part of an operating system kernel.

10. The computer system of claim 8 wherein the program is part of just-in-time code in the operating system kernel.

11. The computer system of claim 8 wherein the program is part of an Abstract Syntax Notation One (ASN .1) parser.

12. The computer system of claim 8 wherein the program is part of a fonts parser.

13. The computer system of claim 6 wherein the program is implemented in ucode.

14. At least one non-transitory computer-readable medium comprising instructions to cause a computer system, upon execution of the instructions by a processor of the computing system, to activate or deactivate a forward-only computing mode in which decrementing of a program counter of the processor is prevented.

15. The medium of claim 14 further comprising instructions for an input character parser.

16. The medium of claim 14 further comprising instructions for part of an operating system kernel.

17. The medium of claim 14 further comprising instructions for part of just-in-time code in the operating system kernel.

18. The medium of claim 14 further comprising instructions for part of an Abstract Syntax Notation One (ASN .1) parser.

19. The medium of claim 14 further comprising instructions for part of a fonts parser.

20. The medium of claim 14 wherein the instructions are implemented in ucode.

21. A method for operating a processor to implement Turing completeness disabling, comprising:

executing instructions fetched from a memory;

storing an address of a next instruction to be executed or an address of a currently executing instruction in a program counter; and, activating a forward-only computing mode to prevent the program counter from being loaded with an address less than an address currently contained in the program counter.

22. The method of claim 21 further comprising setting a model specific register to activate the forward-only computing mode.

23. The method of claim 21 further comprising activating the forward-only computing mode with an executed instruction.

24. The method of claim 21 wherein the processor has multiple cores and further comprising activating the forward-only computing mode on a per-core basis.

25. The method of claim 21 further comprising activating the forward-only computing mode via a system call provided by an operating system.

* * * * *